United States Patent
Soppelsa et al.

(10) Patent No.: US 8,331,020 B2
(45) Date of Patent: Dec. 11, 2012

(54) ILLUMINATION DEVICE FOR A MICROSCOPE

(75) Inventors: Peter Soppelsa, Rebstein (CH); Andreas Klopfer, Wolfurt (AT); Seto Ming, Singapore (SG)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/525,424

(22) PCT Filed: Feb. 4, 2008

(86) PCT No.: PCT/EP2008/051306
§ 371 (c)(1),
(2), (4) Date: Sep. 9, 2009

(87) PCT Pub. No.: WO2008/095880
PCT Pub. Date: Aug. 14, 2008

(65) Prior Publication Data
US 2010/0103511 A1 Apr. 29, 2010

(30) Foreign Application Priority Data
Feb. 9, 2007 (DE) .......................... 10 2007 006 584

(51) Int. Cl.
G02B 21/06 (2006.01)
(52) U.S. Cl. ....................................... 359/390; 359/385
(58) Field of Classification Search .......... 359/368–390, 359/821
See application file for complete search history.

(56) References Cited

U.S. PATENT DOCUMENTS

| | | | |
|---|---|---|---|
| 2,208,882 A * | 7/1940 | Graff et al. ..................... | 359/382 |
| 5,038,258 A | 8/1991 | Koch et al. | |
| 5,570,228 A | 10/1996 | Greenberg | |
| 5,898,518 A | 4/1999 | Biber | |
| 6,533,429 B2 * | 3/2003 | Yoneda ......................... | 362/600 |
| 6,850,637 B1 * | 2/2005 | Burnett ........................ | 382/147 |
| 6,857,762 B2 * | 2/2005 | Shimokawa et al. ......... | 362/245 |
| 6,874,911 B2 * | 4/2005 | Yoneda ......................... | 362/294 |
| 7,286,286 B2 * | 10/2007 | Obuchi ......................... | 359/385 |
| 7,724,429 B2 | 5/2010 | Sander | |
| 2004/0136190 A1* | 7/2004 | Christoph ..................... | 362/235 |
| 2006/0091825 A1 | 5/2006 | Abramovich et al. | |
| 2007/0024965 A1 | 2/2007 | Sander | |
| 2007/0030564 A1 | 2/2007 | Bertschi et al. | |

FOREIGN PATENT DOCUMENTS

| | | |
|---|---|---|
| AT | 137806 B | 6/1934 |
| DE | 195 41 420 A1 | 5/1996 |
| DE | 10 2005 036 230 B3 | 11/2006 |
| DE | 10 2005 034 829 A1 | 2/2007 |
| EP | 1 150 154 A1 | 10/2001 |
| JP | 2005-6960 A | 1/2005 |
| JP | 2005-242386 A | 9/2005 |
| JP | 2007-34301 A | 2/2007 |
| WO | WO 99/62442 A1 | 12/1999 |
| WO | WO 01/61324 A1 | 8/2001 |

* cited by examiner

Primary Examiner — Thong Nguyen
(74) Attorney, Agent, or Firm — Foley & Lardner LLP

(57) ABSTRACT

The invention relates to an illumination device (1) for a microscope (10) utilizing at least one point light source (4) arranged on a carrier element (2), at least one carrier element (2) for receiving at least one point light source (4), and a holder (5) attachable to the microscope (10) and having an arc-shaped guide (6), being provided, the at least one carrier element (2) being mounted displaceably along the guide (6) in a horizontal plane. According to a further aspect, the illumination device (1) comprises a connector element (20) for attaching the illumination device (1) both to a stationary focusing column (12) and to an adjustable focusing arm (11) of a microscope (10).

33 Claims, 6 Drawing Sheets

ILLUMINATION DEVICE FOR A MICROSCOPE

BACKGROUND OF THE INVENTION

1. Field of the Invention

The present invention relates to an illumination device for a microscope, in particular to an incident illumination device for a stereomicroscope, utilizing several point light sources, such as a light-emitting diode, arranged on a carrier element; and to a microscope having such an illumination device.

2. Description of Related Art

DE 10 2005 036 230 B3 discloses a stereomicroscope system having an incident illumination device, the stereomicroscope system comprising a vertical focusing column on which a focusing arm is mounted in vertically displaceable fashion. The focusing arm extends in arc-shaped fashion away from the focusing column, and terminates in an opening that serves to receive the actual stereomicroscope. Several light-emitting diodes are fixedly arranged on the focusing arm, on the one hand around the receiving opening for the stereomicroscope and on the other hand along the arc-shaped portion of the focusing arm. High-performance white-light diodes are used as light-emitting diodes. The light-emitting diodes can be operated individually or in groups, the brightness also being controllable individually or in groups. The light-emitting diodes arranged around the receiving opening serve for vertical/top down incident illumination, while the light-emitting diodes arranged along the arc-shaped portion of the focusing column make available an oblique illumination (angle range from 15 to 105 degrees).

In the context of the aforesaid document, the light-emitting diodes are arranged fixedly on the focusing arm. The elevation angle (height from which the illumination occurs) is therefore predefined by the arrangement of the light-emitting diodes for a fixed azimuth angle. The same applies to the azimuth angle (i.e. the angle on the horizontal circle on which the light-emitting diodes are located around the receiving opening) for which the elevation angle is predefined. Flexible illumination from different azimuth and elevation angles is therefore not possible. A further disadvantage of the proposed arrangement is that the high-performance diodes generate considerable heat, which is conveyed to the focusing arm that in turn is joined to the focusing column.

European Patent EP 1 150 154 B1 discloses an arrangement for (incident) illumination in microscopes having an annular carrier oriented around the optical axis, the illuminating means (white-light diodes) being arranged in the annular carrier in several concentric annular rows located in one plane. The plane of the annular carrier is perpendicular to the optical axis. The light-emitting diodes possess a relatively small emission angle and are directed toward the optical axis of the microscope. The light-emitting diodes can likewise be interconnected in groups, and are operated via a controllable constant-current source.

Here as well, a disadvantage of this proposed illumination arrangement is that azimuthal direction of the illumination to the specimen can be accomplished only by applying control to individual illumination means. Because the latter are arranged at a short distance from one another because of the illumination homogeneity that must be achieved, the number of illumination means to be provided increases greatly with the number of desired angles.

Additionally known, from U.S. Pat. No. 5,038,258, is an illumination arrangement that comprises a semi-spherical carrier at whose center point the object plane of the microscope is placed. Point light sources such as light-emitting diodes are arranged in circular fashion on the carrier at different heights, i.e. planes above the object plane. Here as well, the number and manner of arrangement of the light-emitting diodes therefore determine the possible elevation and azimuth angles at which specimen illumination is possible. The brightness values of the light-emitting diodes can be individually controlled for this purpose. Here as well, an illumination that is flexible in terms of angle requires a large number of illuminating means. The dome-shaped arrangement of the light-emitting diodes on concentric annular rings furthermore impedes access to the specimen.

AT 136 806 B discloses an illuminating device the illuminating device comprising a carriage for receiving one or more miniature incandescent lamps as a light source, and a holder attachable to the microscope tube, the carriage together with the holder being displaceable about the tube axis, in a horizontal plane, on an intermediate piece having a circular guide. Microscope-referred illumination of the focal plane that is defined by the objective being used can thereby be achieved. Because the aforesaid intermediate piece, and the arc-shaped holder, attached thereto, for the carriage having the light source, are fixed in terms of their geometry, it is not apparent how, in the context of an objective change, the illumination device can be adapted to the new objective. The illumination device proposed therein is not suitable for the use of a microscope having an objective turret, as is usual at present. Attachment of the illumination device to the microscope tube furthermore results in the previously mentioned disadvantageous heat transfer to the microscope optics.

DE 195 41 420 A1 discloses a stereomicroscope arrangement having a main observer's microscope and an assistant observer's microscope, and an illumination unit that directs light toward the object plane through the objective that is common to the main and assistant observers' microscopes. The illumination unit is attached to the microscope and can be brought, by rotation about the optical axis, into a position that is optimal for the particular observer. The setting of different elevation and azimuth angles is not addressed in this document.

U.S. Pat. No. 5,570,228 discloses a transmitted illumination device having two or more frames each having a light source, the light of which is directed via a light guide toward the object plane. A suspension point of the light guide can be shifted along a circular-arc-shaped guide. The elevation angle can be modified by means of this adjustment.

DE 10 2005 034 829 A1 discloses a microscope having a surgical slit lamp with a laser light source, the illumination apparatus being mounted displaceably along a circular-arc-segment carrier, the displacement occurring in a plane perpendicular to the object plane. The circular-arc-segment carrier is arranged on the back side of the microscope housing.

Lastly, the use of external illuminating means is known in principle. The illuminating means is placed on a separate stand next to the microscope, and is directed at an arbitrary angle onto the specimen. If the angle between the object plane and illumination axis is approximately 90 degrees, this is referred to generally as vertical illumination, which is used to observe depressions in specimens. At flatter illumination angles an oblique illumination is obtained, which serves to detect three-dimensional specimen structures. At very flat illumination angles, i.e. raking/grazing illumination (almost parallel to the object plane), the term "dark-field illumination" is used. This allows relief and other surface structures to be detected, light scattered and reflected from the structures being used for detection. Separate placement of an illuminating means on a stand next to the microscope costs additional space, represents a potential hazard, and can interfere with work on the specimen. To change the azimuth or elevation angle, the stand must be repositioned and the lighting means must be redirected onto the specimen. This makes it difficult to return to a setting once it has been arrived at.

SUMMARY OF THE INVENTION

It is the object of the present invention to provide an illumination device for a microscope using point light sources, which device enables flexible illumination from different azimuth and/or elevation angles without redirecting the lighting means in each case, in particular so that different contrasting methods can be implemented for stereomicroscopes in simple and reproducible fashion.

The illumination device according to the present invention for a microscope, using several point light sources arranged on a carrier element, is characterized by several carrier elements each for receiving several light sources, and by a holder attachable to the microscope and having an arc-shaped guide, the carrier elements being mounted displaceably along said guide in a plane parallel to the object plane of the microscope or—in other words—in a plane perpendicular to the optical axis. Usefully, the holder is attachable to the microscope in such a way that the centers of curvature of the arc are located on or in the vicinity of the optical axis of the microscope, and the light source is directed onto the focal point or onto a point in the vicinity of the focal point of the microscope. In other words, the carrier element is mounted displaceably along the guide in a horizontal plane along an arc around the specimen, so that as a result, different azimuth angles of the illumination can be set with reference to a specimen point in the object plane of the microscope. The displacement of a carrier element can occur steplessly or in steps. Embodiments having a holder having several arc-shaped guides mounted one above another, or several holders mounted one above another each having an arc-shaped guide, are conceivable. Because several point light sources are provided, it is useful to switch them on or off, and to control their brightness, individually or in groups.

Displacement of a carrier element along the arc-shaped guide of the holder allows a specific azimuth angle to be set for the illumination axis that is defined by the point light source and extends to a specimen point on the object plane of a microscope. The position of the point light source in or on the carrier element, the position of the carrier element on the holder, and the position of the holder in relation to the object plane define the elevation angle (or height) from which specimen illumination occurs. A variety of possibilities for modifiability of the elevation angle are discussed below.

The invention makes possible different contrasting methods in microscopy, with illumination from different azimuth and elevation angles. This is realized, according to the present invention, with the aid of mechanical adjustment of and/or differing application of control to illumination elements (point light sources). The purpose of this adjustability is, among others, to adapt the illumination to the shape of the specimen in order to avoid shadows or glare on reflective samples, and to make topography, relief, or other surface structures visible without rotating the specimen. Markings on the holder permit, in particular, reproducible setting of the carrier elements and thus of the azimuth angle.

A further advantage of the invention is that the point light sources, such as light-emitting (semiconductor) diodes, are received in a carrier element that in turn is attached to a holder. The heat that is produced is thus not conveyed directly to the microscope (e.g. to the focusing arm or focusing column), so there is no risk to the microscope user due to the effect of heat.

The carrier elements can be optimally configured for heat emission (in terms of geometry and material), so that as little heat as possible is transferred to the holder.

It is advantageous if the guide is configured as a circular arc or circle segment, through or in the vicinity of whose center of curvature the optical axis of the microscope extends. In this case the illumination axes of the point light sources meet, at every position of the carrier element along the guide, at a specific point that is usefully located at the focal point of the microscope. A continuous circular arc of 360° is possible in principle, but smaller angles, in particular those from 90° to 180°, are preferred for better access to the specimen.

According to the present invention, several point light sources are provided for each carrier element. The result is that, even when the light sources are fixedly arranged, several different discrete elevation angle values can be implemented if the light sources are installed on the carrier element at different heights (with reference to the object plane). The point light sources on a carrier element are preferably arranged in a second plane that, usefully, approximately contains the centers of curvature of the arc and is substantially perpendicular to the first plane of the guide plane, i.e. substantially perpendicular to the horizontal object plane. The light sources are then, so to speak, arranged one above another within the carrier element; an arrangement one above another on a straight line, i.e. for example in a perpendicular direction or a direction inclined with respect to the object plane, or in an arc-shaped arrangement, can be advantageous. Usefully, the light sources are once again directed onto a point in the vicinity of the focal point of the microscope. A circular-arc-shaped arrangement of the light sources on a carrier element has the advantage that the light sources are all at the same distance from a specimen. In the case of the aforesaid fixed arrangements of the light sources, variation of the elevation angle is effected by switching on different light sources on a carrier element.

Another possibility for varying the elevation angle is afforded when the point light sources are arranged displaceably in a carrier element. Displacement of a light source along a carrier element can be accomplished manually, but also in automatically controlled fashion. It is advantageous to arrange the displaceable light sources within a carrier element on the aforementioned arc perpendicular to the first plane of the guide plane, i.e. perpendicular to the object plane. Depending on the possible displacement range, different elevation angles can thereby be implemented with one or with several light sources.

A combination of the arrangements is, of course, also possible, one or more light sources being arranged fixedly, and another or several other light sources being arranged displaceably, on a carrier element.

Lastly, in order to implement different elevation angles it is also conceivable to arrange a carrier element on the holder of the illumination device, displaceably in a substantially vertical direction. Lastly, the holder of the illumination device can also itself be embodied displaceably in a substantially vertical direction. Because of the limited emission angle of the light sources, however, narrow limits are set on the vertical displacement if the homogeneity of the illumination is to be retained or if it is to be avoided that the light sources have to be aligned correspondingly with great effort.

Light-emitting diodes (LEDs), in particular high-performance diodes, are suitable as point light sources. High-performance white-light diodes are particularly suitable for current contrasting methods in microscopy. If it is desired to work with light in a specific spectral region, light-emitting diodes having a corresponding emission spectrum, or white-light diodes having a corresponding filter in front, are suitable.

It has proven advantageous for practical purposes if, in addition to displaceable carrier elements, at least one stationary carrier element is provided on the guide of the holder of the illumination device. The number of adjustable carrier elements can thereby be reduced without causing practical disadvantages in terms of illumination flexibility.

It is particularly advantageous in this connection if three carrier elements are present, of which the center carrier element is arranged, as a stationary carrier element, at the vertex of the (circular-) arc-shaped guide. Based on a plan view of the carrier elements and object plane, the center carrier element and a specimen point then define a zero-degree line, the two displaceable carrier elements each being displaceable through a specific displacement angle with reference to said zero-degree line, for example through plus or minus 45 degrees or plus or minus 90 degrees. The emission angles of light-emitting diodes (opening angle of the illumination cone) are generally between 5° and 120°. Smaller or larger emission angles are preferred depending on the application.

A displaceable arrangement which can be easily implemented in practice, of a carrier element on a holder of an illumination device according to the present invention is afforded by the fact that the carrier element comprises on its rear side (the side facing away from the light source) a projection having an internal lug that engages into a corresponding groove in the holder by which the guide is formed. Once a specific position of the carrier element is selected, the latter is fastened on the holder, for example by means of a screw attachment (locking screw). A magnetic fastening system is also possible, especially since it can easily be released in order to displace the carrier element along the guide.

With regard to supplying power to the point light sources, it is possible to supply power to each individual light source via a separate cable. This requires displaceable power leads (power cables), which may prove cumbersome in practice. Alternatively, the guide of the holder of the illumination device can serve as a busbar through which the point light sources are powered. For example, a separate busbar can be provided for each carrier element. If several point light sources are present on the carrier element, they can be controlled via a coding system.

In a particularly preferred embodiment, the illumination device according to the present invention is embodied as a microscope module. For this purpose, the holder of the illumination device comprises a connector element for attaching the illumination device to a microscope, in particular to a stationary focusing column of a microscope or to an adjustable focusing arm of a microscope. By attaching the illumination device to the stationary focusing column, an illumination coupled to the specimen can be obtained which is advantageous for images with different focal planes (image stacks). In the other case of attachment to a focusing arm that is adjustable in the focusing direction, optimum respective illumination in the focal plane is obtained. Both methods have their importance in microscopy, in particular in a context of contrasting methods.

In a preferred embodiment, the connector element can be embodied as an individual part that is joinable to the holder of the illumination device. This makes it possible, in particular, for the connector element to be embodied for attachment of the illumination device both to a stationary focusing column and to an adjustable focusing arm of a microscope. The illumination device can then be attached selectably to the stationary focusing column or to the adjustable focusing arm, with the result that the illuminated field is arranged, selectably, fixedly with respect to the specimen or fixedly with respect to the focal plane. This aspect of the invention is expressly regarded as worthy of protection in itself, independently of the illumination device discussed above. The illumination device can consequently be implemented with a holder having a horizontal arc-shaped guide (see description above) or can be embodied as a conventional illumination system. With no limitation as to generality, this aspect of the invention will be further discussed below in connection with the illumination device already referred to. At this point the right to further claiming of this aspect of the invention, independently of the concrete illumination device, is reserved.

According to this aspect of the invention the connector element, embodied as an individual part and joinable to the holder of the illumination device, constitutes both a suitable attachment capability for the focusing column and a suitable attachment device for the focusing arm. Depending on the manner of attachment and therefore type of illumination that is desired, the connector element is correspondingly oriented or aligned and is made to connect on the one hand to the illumination device and on the other hand to the focusing arm or focusing column.

It is useful if the connector element comprises a bracket whose one longitudinal side is embodied for attaching the bracket to the focusing column, and whose other longitudinal side is embodied for attaching the bracket to the focusing arm. As a rule, the focusing arm and focusing column represent longitudinal profiles that have (toward the object plane) different widths and/or different geometries. The bracket can then be a U-shaped retaining bracket that comprises, on its two longitudinal sides, two different U-shaped profiles for attachment to the focusing column and to the focusing arm. Selectable attachment to the focusing column or to the focusing arm can then be implemented by simply rotating the bracket 180°.

The connector element must comprise a further attachment interface to the illumination device. Advantageously, the bracket possesses for this purpose at least one, in particular two, columns for attaching (the holder of) the illumination device to the connector element, for which purpose the holder or illumination device in turn comprises one or more corresponding openings. The illumination device is then placed onto the column(s). It is useful in this context if the at least one column proceeds perpendicularly to the longitudinal direction of the bracket and extends in only one direction from the bracket. The illumination device is thus joined, via the column(s) and the bracket connecting the columns, to the focusing arm or focusing column of a microscope. The columns extend, in particular, parallel to the optical axis of the microscope or parallel to the adjustment direction of the focusing arm, and the bracket preferably extends, in its longitudinal direction, perpendicular to the column direction.

It is advantageous if the holder of the illumination device (or the illumination device in general) is attachable in a specific position along a column. The height of the illumination device above the object plane can thereby once again be set or adjusted.

The physical configuration of the connector element allows the illumination device to be installed quickly and easily in both positions (attachment to the focusing arm or to the focusing column) without additional parts. All that is necessary is to change the orientation of the connector element (or of the retaining bracket). For this, the illumination device is removed from the connector element, and the latter is correspondingly reoriented (rotated 180°) and joined again to the illumination device. This is followed by installation of the connector element plus illumination device onto the focusing arm or focusing column. Depending on the design, it is also conceivable firstly to mount the connector appropriately on the microscope, and then to put the illumination device in place.

The features of the invention that are recited above and have yet to be recited below can be used not only in the combination presented here, but also in other combinations or in isolation, without departing from the scope of the present invention.

The invention and its advantages will be set forth below with reference to exemplifying embodiments that are illustrated in the drawings.

DETAILED DESCRIPTION OF EMBODIMENTS OF THE INVENTION

Figure 1:
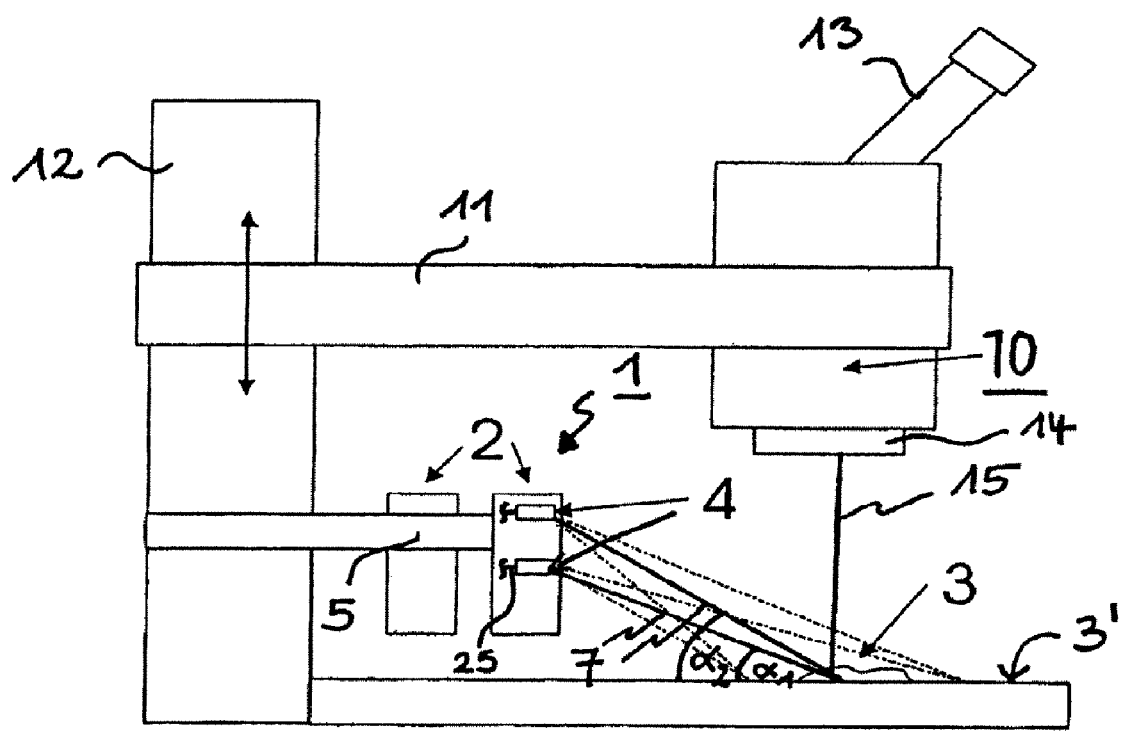
FIG. 1 is a very schematic side view of a microscope having an illumination device according the invention.
Figure 2:
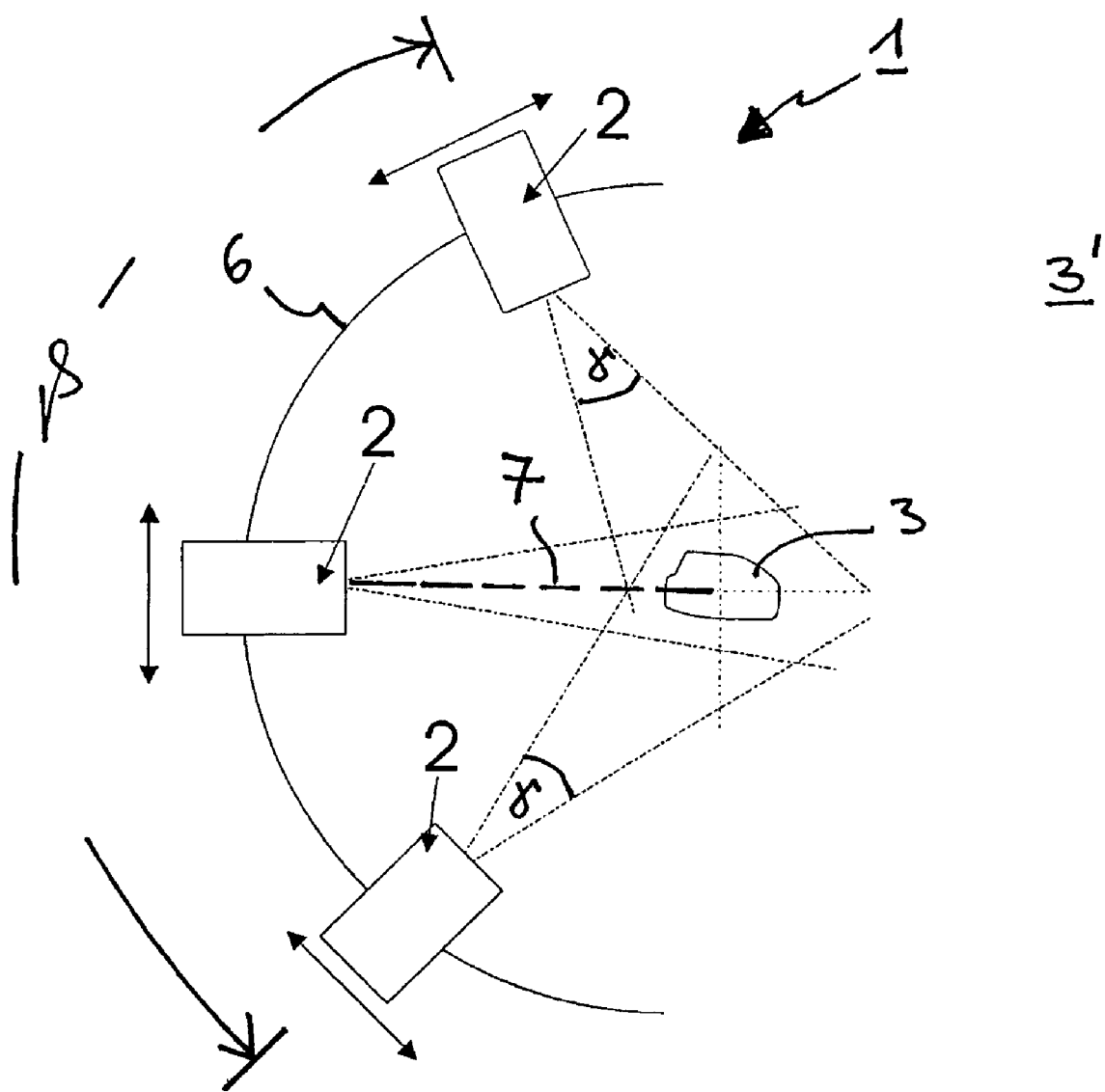
FIG. 2 is a very schematic plan view of an illumination device according to the invention, and of an object plane of a microscope.

The invention will first be outlined in its essentials with reference to the schematic depictions of FIGS. 1 and 2: FIG. 1 is a side view of a microscope 10 having an illumination device 1. Illumination device 1 comprises, in this depiction, two carrier elements 2 each for receiving two point light sources (in this case light-emitting diodes 4), and a holder 5. Microscope 10 is joined, via a focusing arm 11 displaceable in a vertical direction, to a vertical focusing column 12. Microscope 10 comprises in turn an eyepiece 13 and an objective 14, which generate in known fashion an image of a specimen 3.

Illumination device 1 is joined to focusing column 12 via a connector element that is not depicted here in detail. This aspect of the invention will be discussed in further detail below. Holder 5 of illumination device 1 carries a carrier element 2 that comprises two light-emitting diodes 4 whose illumination axes 7 are directed onto specimen 3 (or onto the object plane). The corresponding elevation angles are indicated as $\alpha_1$ and $\alpha_2$. Elevation angle $\alpha$ can consequently be varied here by switching over light-emitting diodes 4. Alternatively or additionally, a modification of the elevation angle can be accomplished by the fact that a carrier element 2 is attached to holder 5 displaceably in a vertical direction, and/or that holder 5 itself is attached (in this case to focusing column 12) displaceably in a vertical direction. Care must of course be taken, in the context of the latter possibilities, that specimen 3 continues to remain in the light cone of light-emitting diodes 4.

FIG. 2 is a very schematic plan view of illumination device 1 and of the object plane with specimen 3. Guide 6 of holder 5 of illumination device 1 is depicted (cf. FIG. 1), as are three carrier elements 2. In this depiction, all three carrier elements 2 are mounted displaceably along circular-arc-shaped guide 6. A total displacement range of approximately 90° is depicted. Azimuth angle β can thus be modified between 0° and 90°. Guides 6 having a larger angle range are, of course, conceivable and also advisable depending on the intended purpose. Care should be taken in this context, however, that access to specimen 3 is not excessively restricted. Emission angle γ of light-emitting diodes 4 (cf. FIG. 1) is also sketched in FIG. 2. Typical emission angles γ are between 5° and 120°. In the present case, emission angle γ is approximately 20°, so that specimen 3 is located almost completely in the light cone of light-emitting diodes 4.

As is evident from FIGS. 1 and 2, the arc-shaped guide 6 of carrier elements 2 is located in a horizontal plane (identical to the drawing plane in FIG. 2) that extends parallel to the object plane and perpendicular to optical axis 15 as the latter is defined by microscope 10.

Figure 3:
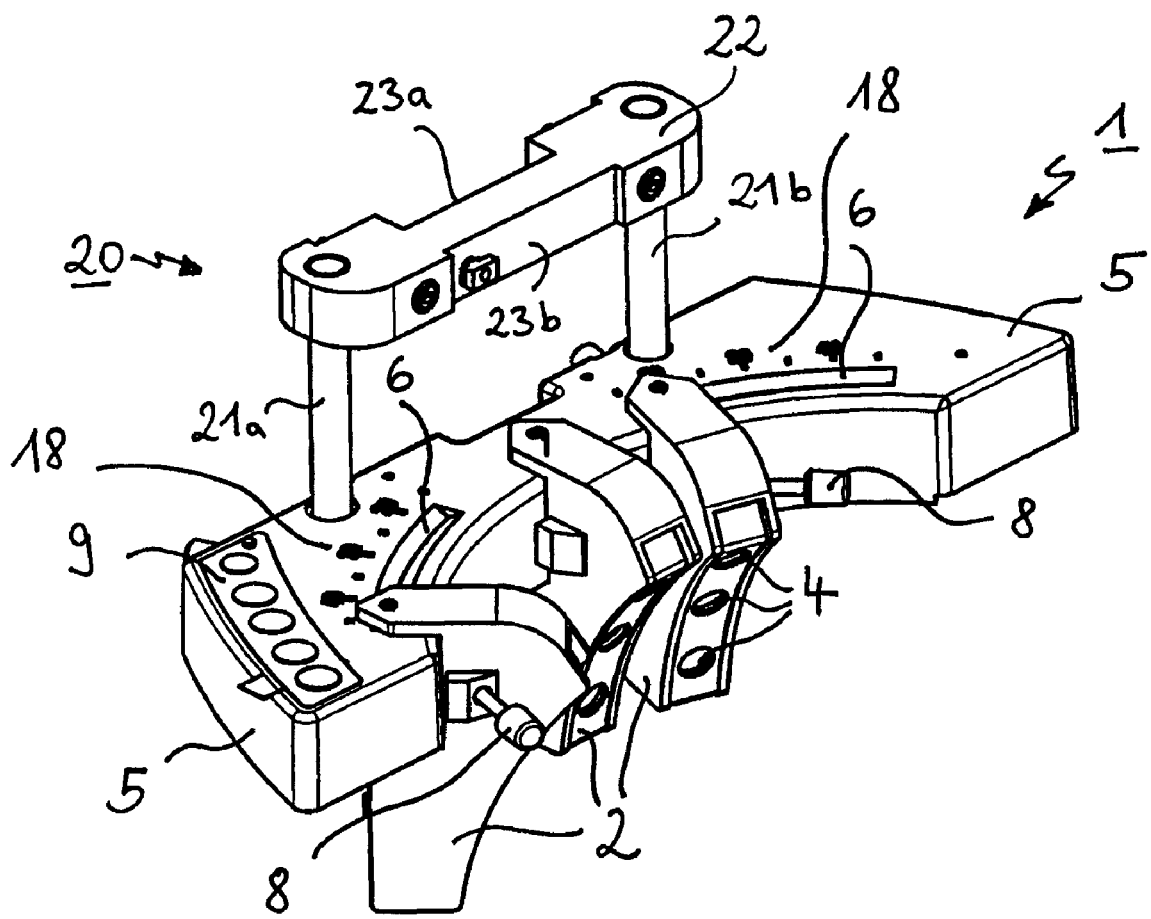
FIG. 3 is a perspective view of an illumination device having a connector element for attaching the illumination device to the focusing arm of a microscope.

While in FIG. 1 light-emitting diodes 4 are arranged one above another in a vertical direction in carrier element 2, FIG. 3 shows an arc-shaped arrangement of point light sources 4 on a carrier element 2. For the sake of completeness, be it noted that the light-emitting diodes or point light sources 4 can also be arranged displaceably within a carrier element 2 in order to effect a change in elevation angle α.

FIG. 3 shows an illumination device 1 having three carrier elements 2, of which two carrier elements 2 are respectively mounted, on a holder 5, displaceably along an arc-shaped guide 6. The center one of the three carrier elements 2 is arranged fixedly on holder 5. Each carrier element 2 comprises three fixedly arranged point light sources (here, light-emitting diodes 4) that, as already mentioned, are arranged in (circular-) arc fashion in a vertical direction. The center point of the circular arc segment is advantageously located in specimen 3 (cf. FIG. 1). A scale 18 enables reproducible positioning of carrier elements 2.

As is evident from FIG. 3, the azimuth angle is adjustable, proceeding from the fixedly arranged center carrier element 2, in a range from ±15° to ±45°. This adjustment range has proven useful in practice. The two adjustable carrier elements 2 each comprise a locking screw 8 with which the corresponding carrier element 2 can be fastened in the selected position on holder 5. Reference is made again here to the further possibilities of magnetic fastening and electronically controlled displacement of a carrier element 2.

It is evident from the perspective view of FIG. 3 that carrier elements 2 have U-shaped openings that are present on the side facing away from light-emitting diodes 4 for guidance along holder 5. It is useful in this context if, in the upper part of the U-shaped opening, carrier element 2 comprises an internal lug that engages into the groove of guide 6. As already explained above, power supply to the individual light-emitting diodes 4 can also be achieved thereby if guide 6 encompasses a busbar that is tapped by carrier element 2. In this case control would need to be applied to the individual light-emitting diodes 4 via a coding system. As an alternative thereto, each light-emitting diode 4 possesses its own current lead.

The number 9 designates a membrane keypad that serves for operation of illumination device 1; provision can be made not only for on/off switching but also for a brightness controller and for switching of the sequences of individual light-emitting diodes 4 or of a group of light-emitting diodes 4. Carrier elements 2 serve simultaneously as heat sinks for light-emitting diodes 4 and can be optimized in terms of their conformation for a sufficient cooling effect (cooling ribs, active cooling, and the like). This is advantageous for the integration of high-performance light-emitting diodes (socalled power LEDs). Alternatively or in addition to membrane keypad 9, illumination device 1 can also be remotely controlled via a computer or the like.

The arrangement of light-emitting diodes 4 on a carrier 2 is advantageously configured so that the uppermost light-emitting diode 4 can be used for vertical incident illumination, the center light-emitting diode 4 for oblique illumination, and the lowest light-emitting diode 4 for dark-field illumination. The attachment of light-emitting diodes 4 in a depression in carrier element 2 permits light-emitting diodes 4 to be covered in order to protect the user from burns and at the same time to protect diodes 4 themselves. The cover can also serve to receive color filters; depending on the intended application, all the light-emitting diodes 4 can be filtered identically or differently. Stepless or stepped displacement of carrier elements 2 around specimen 3 (cf. FIGS. 1 and 2) allows a wide variety of illumination types and directions to be easily implemented without moving specimen 3.

Illumination unit 1 represents an independent module that can be joined to a microscope, more specifically to a focusing arm or focusing column of a microscope. For this purpose, the rear side (the side of holder 5 facing away from carrier elements 2) can be correspondingly configured for attachment to the microscope. Alternatively, according to a further aspect of the invention, a connector element 20 is provided, which is to be joined to illumination device 1 in order to mount illumination device 1 onto a microscope 10 or (more precisely) selectably onto focusing column 12 or onto focusing arm 11 (cf. FIG. 1). Connector element 20 is embodied here as an individual part that is to be joined to holder 5 of illumination device 1 via two columns. The two columns 21a, b are in turn attached to a bracket 22 of connector element 20 and proceed from bracket 22 in one direction and parallel to one another. As will be explained in further detail below, bracket 22 has on its respective longitudinal sides two different profiles or U-shaped openings 23a, b for attaching bracket 22 to focusing column 12 or to focusing arm 11.

It is advantageous if illumination device 1 is mounted displaceably on columns 21a, b of connector element 20. This makes it possible, after connector element 20 is mounted onto focusing arm 11 or onto focusing column 12 of microscope 10, additionally to perform a (vertical) displacement of illumination device 1 for alignment purposes or for the purpose of further varying the elevation angle.

Figure 4:
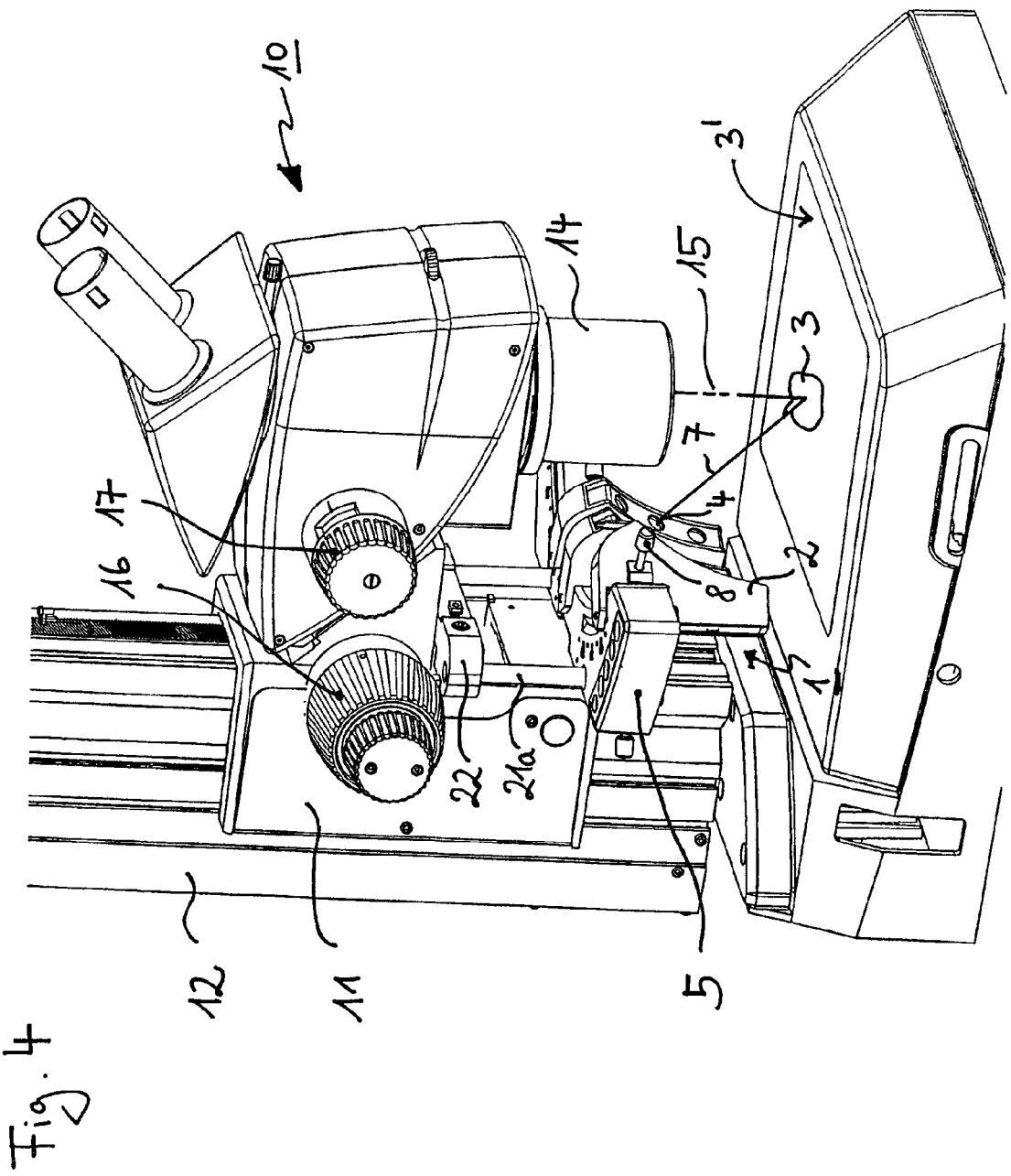
FIG. 4 shows the illumination device of FIG. 3 attached to the focusing arm of a microscope.

With the orientation of connector element 20 on illumination device 1 depicted in FIG. 3, said device is provided for attachment to focusing arm 11 of microscope 10 depicted in FIG. 4.

FIG. 4 is a perspective depiction of illumination device 1 of FIG. 3 that is attached to focusing arm 11 of a microscope 10. Microscope 10 is a stereomicroscope having an objective 14, followed by a microscope housing in which a zoom system is located. The magnification of the zoom system can be modified by operating adjusting knob 17 for the zoom system. This is followed by a further housing attachment, in which the tube is accommodated and onto which eyepieces 13 (cf. FIG. 1) are to be placed. The manner of operation of a stereomicroscope 10 is known per se and will therefore not be explained further. The actual microscope 10 is carried by a focusing arm 11 that is in turn attached displaceably to a vertical focusing column 12. Rotary knob 16 enables coarse/fine adjustment of the vertical height of the focusing arm. This design is also known per se and will therefore not be explained further.

In the position depicted in FIG. 3, illumination device 1 is mounted via connector element 20 on focusing arm 11. For this purpose, U-shaped profile 23a is oriented toward focusing arm 11. Profile 23a engages into the profile of focusing arm 11, and the two parts can be attached to one another with a usual attachment method (e.g. by thread connection). When focusing arm 11 is displaced in a vertical direction by actuating rotary knob 16, illumination device 1 thus moves along with focusing arm 11. The illumination in the respective focal plane thus remains constant.

As is evident from FIG. 4, illumination unit 1 can be displaced in a vertical direction via columns 21a, 21b, thus enabling fine adjustments. For an explanation of illumination device 1 itself, reference is made to the statements regarding FIG. 3. As is further evident from FIG. 4, illumination axes 7 of light-emitting diodes 4 strike specimen 3 on object plane 3'. Specimen 3 is located on optical axis 15 of microscope 10, usually at its focus.

Figure 5:
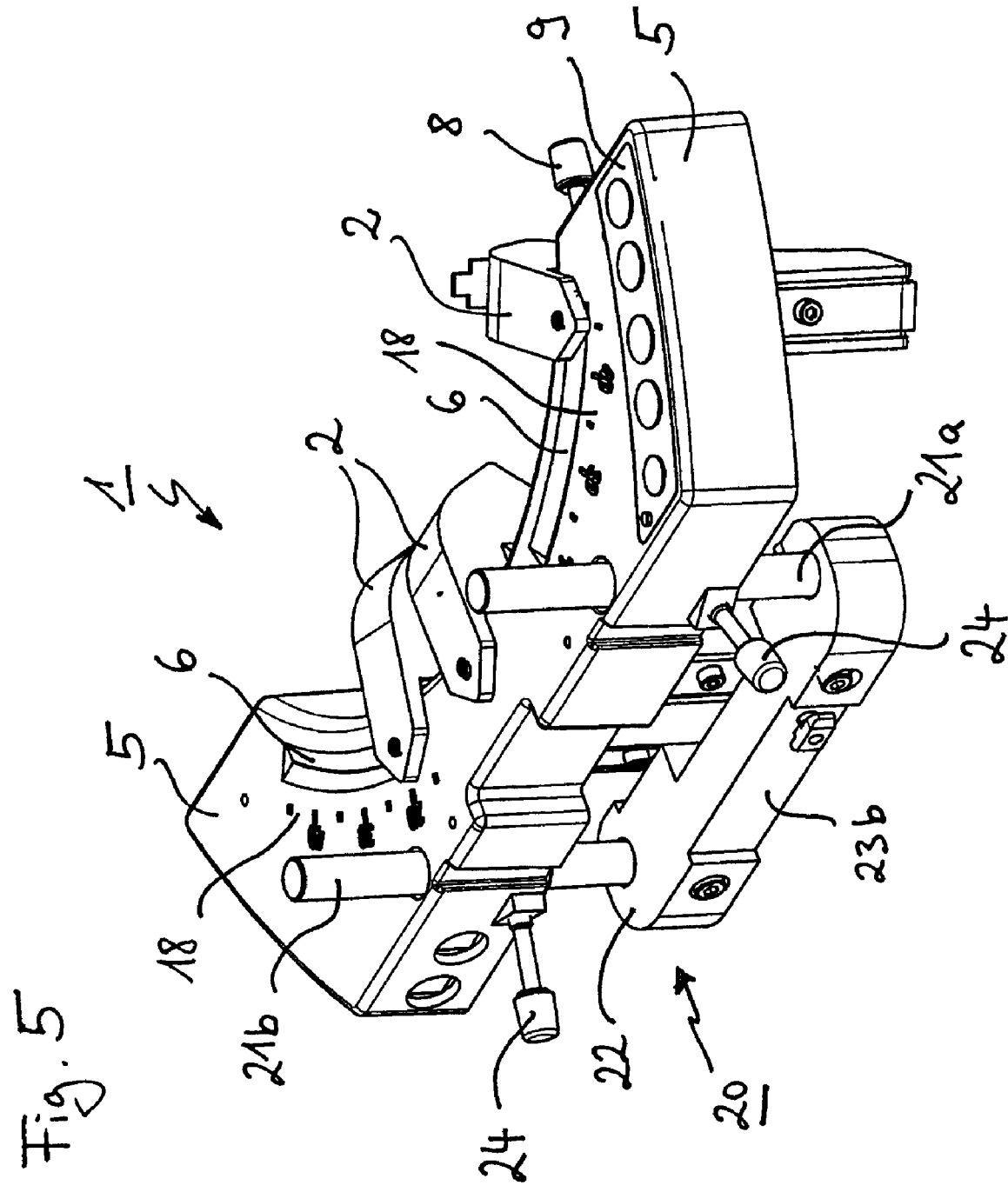
FIG. 5 is a perspective view of an illumination device having a connector element for attaching the illumination device to the focusing column of a microscope.
Figure 6:
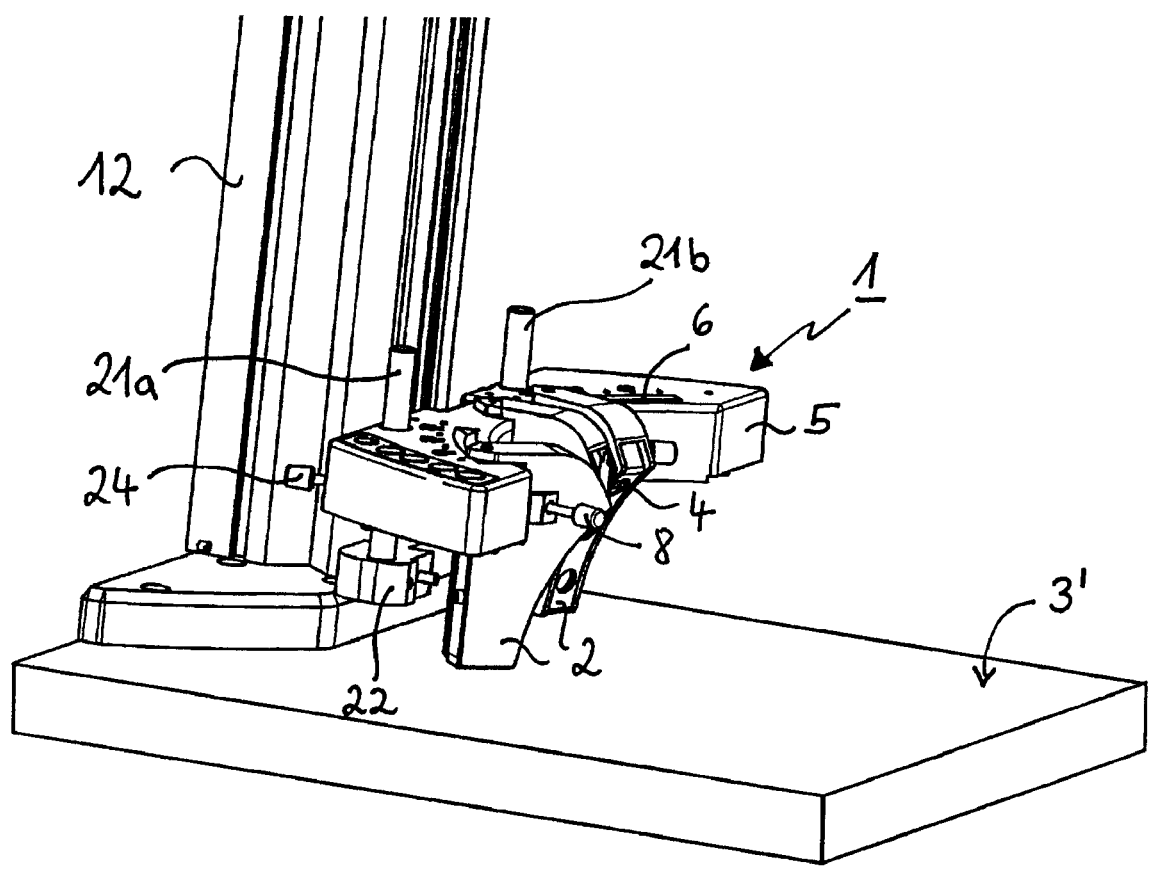
FIG. 6 shows the illumination device of FIG. 5 mounted onto the focusing column of a microscope.

FIGS. 5 and 6 show the orientation of the connector element on illumination device 1 for attachment thereof to focusing column 12 of microscope 10 depicted in FIG. 4. With regard to the details of illumination device 1 and of microscope 10, reference is made to the preceding Figures. Only the differences as compared with FIGS. 3 and 4 will be discussed below.

In order to connect illumination device 1 to focusing column 12, connector element 20 is removed from illumination device 1, rotated from top to bottom and from left to right (i.e. 180° in each case), and then joined to illumination device 1 again. As a result, it is now possible to introduce columns 21a and 21b from below through the corresponding openings in illumination device 1. Also visible in the view of FIG. 5 are locking screws 24 with which illumination device 1 can be displaced along columns 21a, 21b and fastened. The opening or U-shaped profile 23b now faces outward. This profile is configured correspondingly to the profile of focusing column 12, thus enabling engagement of the profiles and attachment of connector element 20 to focusing column 12.

FIG. 6 shows the assembled state, in which illumination device 1 is attached via connector element 20 to focusing column 12 of microscope 10 (cf. FIG. 4). For the sake of clarity, the details in FIG. 4 regarding the microscope are omitted from FIG. 6. With this type of installation, a stationary illumination that is always directed onto specimen 3 can be implemented. This type of illumination is advantageous when image stacks are to be acquired, e.g. for three-dimensional image production. Assembly is accomplished by first attaching connector element 20 to focusing column 12 in the manner depicted in FIG. 6. Illumination device 1 is then placed onto columns 21a, 21b and in turn fastened using locking screws 24. This procedure has proven particularly useful in practice. It is also conceivable in principle to omit a 180° rotation of connector element 20 from top to bottom, and simply to rotate connector element 20 180 degrees from left to right out of the orientation depicted in FIG. 3, in order to mount it on focusing column 12. In that case illumination device 1 would first need to be installed onto connector element 20 before the latter is mounted on focusing column 12.

PARTS LIST

1 Illumination device
2 Carrier element
3 Specimen
3' Object plane
4 Light source, light-emitting diode
5 Holder
6 Guide
7 Illumination axis
8 Locking screw
9 Membrane keypad 10 Microscope
11 Focusing arm
12 Focusing column
13 Eyepiece
14 Objective
15 Optical axis
16 Rotary knob for focusing arm
17 Adjusting knob for zoom
18 Scale
20 Connector element
21a, b Columns
22 Bracket
23a, b Openings, profile
24 Locking screws
25 Power lead
$\alpha, \alpha_1, \alpha_2$ Elevation angles
$\beta$ Azimuth angle
$\gamma$ Emission angle

The invention claimed is:

1. An illumination device for a microscope, comprising:
a plurality of carrier elements each configured to receive a plurality of point light sources, and
a holder attachable to the microscope and having an arc-shaped guide,
wherein the holder and guide lie in a horizontal first plane substantially parallel to an object plane of the microscope,
wherein the plurality of carrier elements are mounted displaceably along the guide, and
wherein the plurality of point light sources on at least one of the carrier elements are arranged in a second plane that is substantially perpendicular to the horizontal first plane.

2. The illumination device according to claim 1, wherein the guide is configured as a circular arc or circular arc segment.

3. The illumination device according to claim 2, wherein the circular arc or circular arc segment encompasses an angle from 90° to 360°.

4. The illumination device according to claim 1, wherein the plurality of point light sources on at least one of the carrier elements are arranged one above another on a straight line.

5. The illumination device according to claim 1, wherein the plurality of point light sources on at least one of the carrier elements are arranged with an offset from one another.

6. The illumination device according to claim 5, wherein the plurality of point light sources on the at least one of the carrier elements are arranged with an offset from one another in arc-shaped fashion.

7. The illumination device according to claim 1, wherein one or more of the plurality of point light sources are arranged displaceably in at least one of the carrier elements.

8. The illumination device according to claim 1, wherein at least one of the point light sources is a light-emitting diode.

9. The illumination device according to claim 8, wherein the light-emitting diode is a high-performance diode.

10. The illumination device according to claim 8, wherein the light-emitting diode is a high-performance white-light diode.

11. The illumination device according to claim 1, wherein at least one of the carrier elements is fastenable on the holder by a releasable attachment.

12. The illumination device according to claim 1, wherein the guide of the holder of the illumination device comprises a busbar for powering at least one of the point light sources.

13. The illumination device according to claim 1, wherein each point light source has a separate power lead.

14. The illumination device according to claim 1, wherein the holder of the illumination device comprises a connector element configured to attach the illumination device to a stationary focusing column or to an adjustable focusing arm of the microscope.

15. The illumination device according to claim 14, wherein the connector element is embodied as an individual part that is joinable to the holder of the illumination device.

16. The illumination device according to claim 14, wherein the connector element is embodied for attachment of the illumination device both to the stationary focusing column and to the adjustable focusing arm of the microscope.

17. The illumination device according to claim 16, wherein the connector element comprises a bracket whose one longitudinal side is configured to attach the bracket to the focusing column, and whose other longitudinal side is configured to attach the bracket to the focusing arm.

18. The illumination device according to claim 17, wherein the bracket comprises at least one column configured to attach the holder of the illumination device to the connector element, for which purpose the holder in turn comprises a corresponding opening.

19. The illumination device according to claim 18, wherein the at least one column proceeds perpendicularly to the longitudinal direction of the bracket and extends in one direction from the bracket.

20. The illumination device according to claim 18, wherein the holder of the illumination device is attachable in a specific position along the at least one column.

21. The illumination device according to claim 18, wherein the at least one column is aligned parallel to an adjustment direction of the focusing arm, or parallel to a focusing column direction, when the connector element is installed on the microscope.

22. A microscope having an illumination device according to claim 1.

23. The microscope according to claim 22, in which the holder of the illumination device is attached to the microscope in such a way that a center of curvature of the arc-shaped guide is located on or in the vicinity of an optical axis of the microscope.

24. The microscope according to claim 22, in which the holder of the illumination device is attached to the microscope in such a way that at least one light source of the illumination device is directed onto a focal point, or onto a point in the vicinity of the focal point, of the microscope.

25. The microscope according to claim 24, in which all of the plurality of point light sources of the illumination device are directed onto the focal point, or onto a point in the vicinity of the focal point, of the microscope.

26. The illumination device according to claim 1, wherein the second plane contains a center of curvature of the arc-shaped guide.

27. An illumination device according to claim 1, wherein a center of curvature of the arc-shaped guide is located on an optical axis of the microscope.

28. A stereomicroscope having an illumination device according to claim 1.

29. The illumination device according to claim 1, wherein the object plane of the microscope is substantially perpendicular to an optical axis of the microscope.

30. An illumination device for a microscope, comprising:
a plurality of carrier elements each configured to receive a plurality of point light sources, and
a holder attachable to the microscope and having an arc-shaped guide, wherein the plurality of carrier elements are mounted displaceably along the guide in a horizontal plane, and wherein a stationary carrier element is additionally present on the guide of the holder.

31. The illumination device according to claim 30, wherein three carrier elements are present, of which the center carrier element is arranged as a stationary carrier element at the vertex of the arc-shaped guide.

32. An illumination device for a microscope, comprising:
a plurality of carrier elements each configured to receive a plurality of point light sources, and
a holder attachable to the microscope and having an arc-shaped guide,
wherein the plurality of carrier elements are mounted displaceably along the guide in a horizontal first plane parallel to an object plane of the microscope, and
wherein the plurality of point light sources on at least one of the carrier elements are arranged in a second plane that is substantially perpendicular to the horizontal first plane.

33. The illumination device according to claim 32, wherein the object plane of the microscope is substantially perpendicular to an optical axis of the microscope.

* * * * *